United States Patent [19]

Nikoh

[11] Patent Number: 5,406,335
[45] Date of Patent: Apr. 11, 1995

[54] PAL ENCODER USING A DIGITAL SIGNAL PROCESSING

[75] Inventor: Hidemitsu Nikoh, Tokyo, Japan

[73] Assignee: NEC Corporation, Tokyo, Japan

[21] Appl. No.: 102,264

[22] Filed: Aug. 5, 1993

[30] Foreign Application Priority Data

Aug. 10, 1992 [JP] Japan .................... 4-211901

[51] Int. Cl.⁶ .................... H04N 11/16; H04N 11/12
[52] U.S. Cl. .................... 348/642; 348/639; 348/640
[58] Field of Search .................... 358/24, 23, 13 C, 13, 358/12, 18, 330, 21 R, 638–642, 660, 659, 662, 720, 493, 492, 488, 508, 509, 507, 472, 471, 727; H04N 11/16, 11/12, 11/14

[56] References Cited

U.S. PATENT DOCUMENTS

| | | | |
|---|---|---|---|
| 4,349,833 | 9/1982 | Clarke | 358/23 |
| 4,412,181 | 10/1983 | Marguinaud et al. | 358/23 |
| 4,982,179 | 1/1991 | Ogawa et al. | 358/23 |
| 5,159,435 | 10/1992 | Holmbo et al. | 358/13 X |
| 5,216,496 | 1/1993 | Miyamoto et al. | 348/488 X |

FOREIGN PATENT DOCUMENTS 0019936 12/1980 European Pat. Off. .............. 358/24
0530950 3/1993 European Pat. Off. ...... H04N 11/16
60-198985 10/1985 Japan .................... 358/24
1-152892 6/1989 Japan .................... H04N 11/16

*Primary Examiner*—James J. Groody
*Assistant Examiner*—Safet Metjahic
*Attorney, Agent, or Firm*—Sughrue, Mion, Zinn, Macpeak & Seas

[57] ABSTRACT

A PAL encoder comprises phase converter, first and second low-pass filters, a burst signal adder, a chrominance subcarrier generator, and a modulator. The phase converter converts digital first and second color-difference signals into digital U-axis and V-axis signals. The first and second low-pass filters pass low-frequency components of the digital U-axis and V-axis signals to produce band-rejected U-axis and V-axis signals, respectively. The burst signal adder adds a predetermined burst signal to the band-rejected U-axis and V-axis signals to produce burst-added U-axis and V-axis signals, respectively. The chrominance subcarrier generator outputs digital sine and cosine signals of the chrominance subcarrier. The modulator multiplies the burst-added U-axis signal by the sine signal and the burst-added V-axis signal by the cosine signal and adds the multiplied results to produce a digital chroma signal.

9 Claims, 8 Drawing Sheets

FIG. 7A  ERY  —⟨ ERY1 ⟩⟨ ERY2 ⟩//⟨ ERYn-1 ⟩⟨ ERYn ⟩—

FIG. 7B  EBY  —⟨ EBY1 ⟩⟨ EBY2 ⟩//⟨ EBYn-1 ⟩⟨ EBYn ⟩—

FIG. 7C  LS

FIG. 7D  EU   —⟨ EU1 ⟩⟨ EU2 ⟩//⟨ EUn-1 ⟩⟨ EUn ⟩—

FIG. 7E  EV/-EV  —⟨ -EV1 ⟩⟨ -EV2 ⟩//⟨ +EVn-1 ⟩⟨ +EVn ⟩—

FIG. 7F  LEU  —⟨ LEU1 ⟩⟨ LEU2 ⟩//⟨ LEUn-1 ⟩⟨ LEUn ⟩—

FIG. 7G  LEV/-LEV  —⟨ -LEV1 ⟩⟨ -LEV2 ⟩//⟨ LEVn-1 ⟩⟨ LEVn ⟩—

FIG. 7H  BEU  —⟨ EU1 ⟩⟨ BU2 ⟩//⟨ EUn-1 ⟩⟨ BUn ⟩—

FIG. 7I  BEV/-BEV  —⟨ -BEV1 ⟩⟨ -BV ⟩//⟨ +BEVn-1 ⟩⟨ +BV ⟩—

FIG. 7J  BF

FIG. 7K  SIN  —⟨ SIN1 ⟩⟨ SIN2 ⟩//⟨ SINn-1 ⟩⟨ SINn ⟩—

FIG. 7L  COS  —⟨ COS1 ⟩⟨ COS2 ⟩//⟨ COSn-1 ⟩⟨ COSn ⟩—

FIG. 7M  EC   —⟨ BEU1×SIN1−BEV1COS1 ⟩//⟨ BEUn-1SINn-1+BEVn-1COSn-1 ⟩—

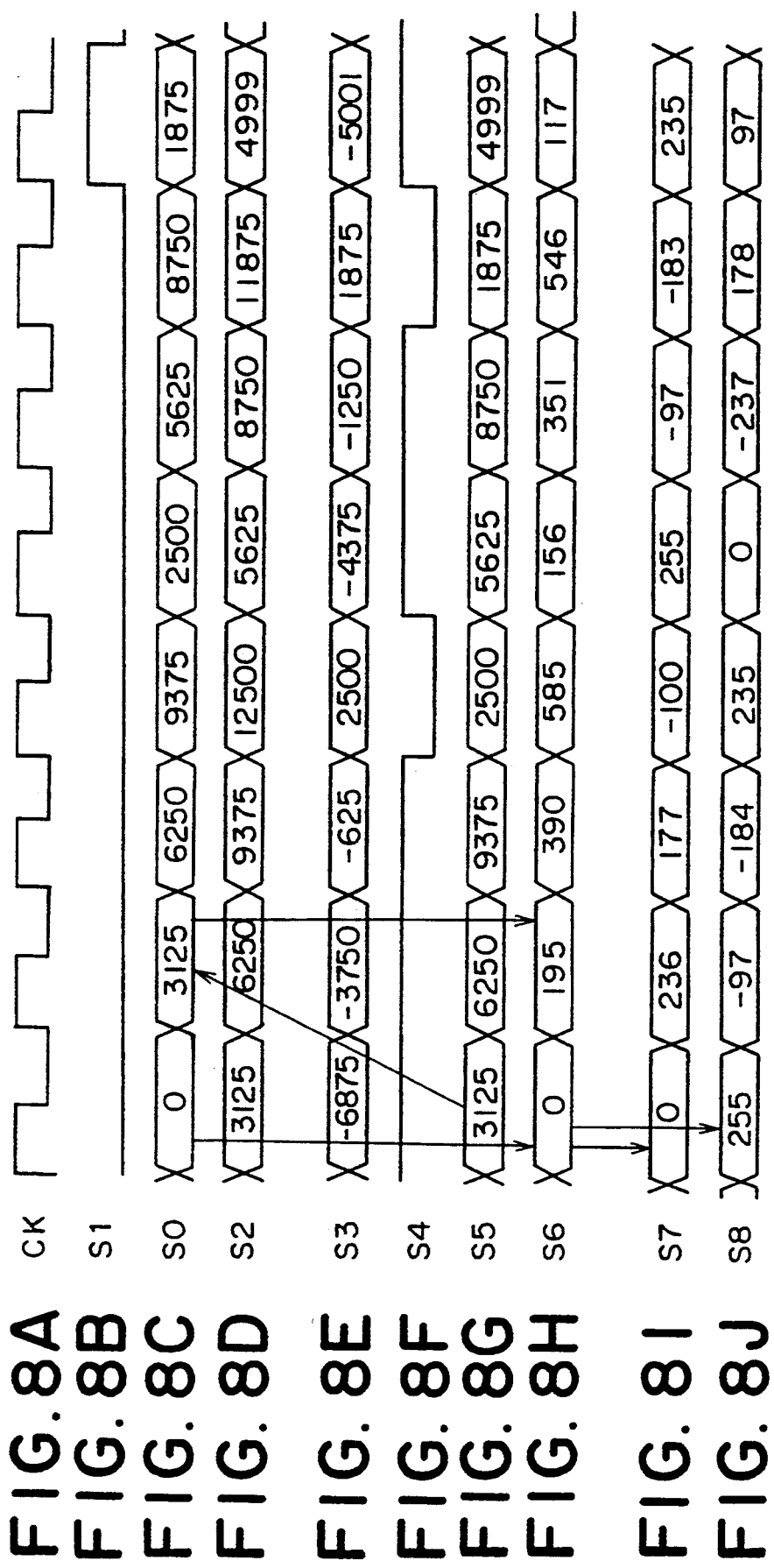

PAL ENCODER USING A DIGITAL SIGNAL PROCESSING

BACKGROUND OF THE INVENTION

1. Field of the Invention

The present invention relates to a PAL (Phase Alternation by Line) encoder and more particularly to a PAL encoder in which a color signal processing is implemented by using a digital image signal processing.

2. Description of Related Art

FIG. 1 shows an example of an arrangement of a conventional PAL encoder. The PAL encoder shown in FIG. 1 is described in "Television", 1975, Vol. 29, No. 10 pp760-771, published from "Television Gakkai (Television Institute)".

The PAL encoder shown in FIG. 1 comprises a matrix circuit 101, low-pass filters (LPFs) 102, 103, balanced modulators 104, 105, an adder 106, a chrominance subcarrier generator 107, phase converters 109 to 112, a burst gate 113, and a switch circuit S101. Input terminals T101 to T103 for inputting color signals ER, EG, and EB are connected to the matrix circuit 101. The LPFs 102, 103 limit bands of a U-axis signal EU and V-axis signal EV from the matrix circuit 101. The balanced modulators 104 and 105 balance-modulate the outputs LEV, LEU from the LPFs 102 and 103 in accordance with the outputs from the phase converters 109 to 112. The adder 106 adds the outputs from the balanced modulators 104 and 105. The chrominance subcarrier generator 107 generates a chrominance subcarrier signal CS. The phase converters 109 to 112 are cascade connected to perform the phase conversions of −45 degrees, −90 degrees, −45 degrees, and −90 degrees, respectively.

An operation of the conventional PAL encoder shown in FIG. 1 will now be described.

The color signals ER, EG, and EB are supplied to the input terminals T101 to T103. The matrix circuit 101 converts the color signals ER, EG, and EB into U- and V-axes signals EU and EV in the UCS system of color representation, one of CIE standard colorimetric system. The high-frequency components of the U- and V-axes signals EU and EV are removed by the LPFs 102 and 103, resulting in signals LEV and LEU. Then, the signals LEV and LEU are input to the balanced modulators 104 and 105.

On the other hand, the chrominance subcarrier generator 107 generates a chrominance subcarrier signal CS=sin (ωt+270°) and supplies it to the phase converters 109 to 112. Note that ω=2π fsc wherein fsc represents a chrominance subcarrier frequency in the PAL system and t represents time. The phase converters 109 to 112 outputs signals sin (ωt+225°), sin (ωt+135°), sin (ωt+90°) and sin (ωt). Accordingly, the signal sin (ωt) is input to the balanced modulator 105.

Further, the signals cos (ωt) (=sin (ωt+90°) and −cos (ωt) (=sin (ωt+270°) is selected by the switch circuit S101 controlled by a line switch signal LS input from the input terminal 105. The selected signal is input to the balanced modulator 104. The line switch signal LS becomes high (H) and low (L) levels in the odd and even lines of the first and second fields, respectively. Further, the signal LS becomes L and H levels in the odd and even lines of the third and fourth fields, respectively.

As a result, LEU sin (ωt) and LEV cos (ωt)/-LEV cos (ωt) are output from the balanced modulators 105 and 104, respectively. In this embodiment, a signal switched for every line is indicated by using a delimiter "/".

The switch circuit S102 controlled by the line switch signal LS selects and supplies to the burst gate 113 the signal sin (ωt+135°) in the odd lines of the first and second fields and in the even lines of the third and fourth fields, and selects and supplies to the burst gate 113 the signal −sin (ωt+135°) (=sin (ωt+225°)) in the even lines of the first and second fields and in the odd lines of the third and fourth fields. The burst gate 113 performs a gain control for a burst level adjustment with respect to the supplied signal and passes the input signal only during a burst period.

The adder 106 adds the outputs of the balanced modulators 104 and 105 and the output of the burst gate 113, and outputs the added result from the output terminal T106 as the PAL color signal component.

The above described PAL encoder comprises an analog signal processing circuit. For this reason, it is difficult to suppress the phase distortion of the signal. For this reason, if a high-frequency characteristic in a signal processing is improved in order to implement a high resolution system, the frequency characteristic is affected by the phase distortion or the like, and thus it is difficult to keep the accuracy of the color signal in the PAL system. Further, when the PAL encoder is to be integrated by an LSI, many peripheral components are required, resulting in increased check items.

SUMMARY OF THE INVENTION

The present invention has been intended in view of the above drawbacks and its object is to provide a PAL encoder which is easy to be integrated by an LSI and which has small phase distortion of a signal.

In order to achieve the above object, a PAL encoder according to the present invention comprises: phase converting means for receiving and converting a digital first color-difference signal and a second color-difference signal (ERY, EBY) into a digital U-axis signal (EU) and a digital V-axis signal (EV/-EV) as U-axis and V-axis components in the UCS system of color representation; burst-signal adding means connected to the phase converting means, for adding a predetermined burst signal to the digital U-axis and V-axis signals and for outputting a burst-added U-axis signal (BEU) and a burst-added V-axis signal (BEV/-BEV); chrominance subcarrier generating means for outputting digital sine and cosine signals each having a predetermined chrominance subcarrier frequency; and modulating means connected to the burst-signal adding means and the chrominance subcarrier generator, for multiplying the burst-added U-axis signal (BEU) by the sine signal (SIN), and multiplying the burst-added V-axis signal (BEV/-BEV) by the cosine signal (COS), adding the multiplied results, and for outputting digital chroma signal (EC).

According to the PAL encoder with the above arrangement, a chroma signal with stable and small phase distortion can be generated. Further, the PAL encoder can be implemented by using a digital signal processing, it is easy to integrated by an LSI with reduced peripheral components.

BRIEF DESCRIPTION OF THE DRAWINGS

FIGS. 7A through 7M are waveforms for explaining the operation of the PAL encoder shown in FIG. 2; and FIGS. 8A through 8J are waveforms for explaining the operation of the chrominance subcarrier generator shown in FIG. 6.

DETAILED DESCRIPTION OF THE PREFERRED EMBODIMENTS

A PAL encoder according to an embodiment of the present invention will now be described.

Figure 1:
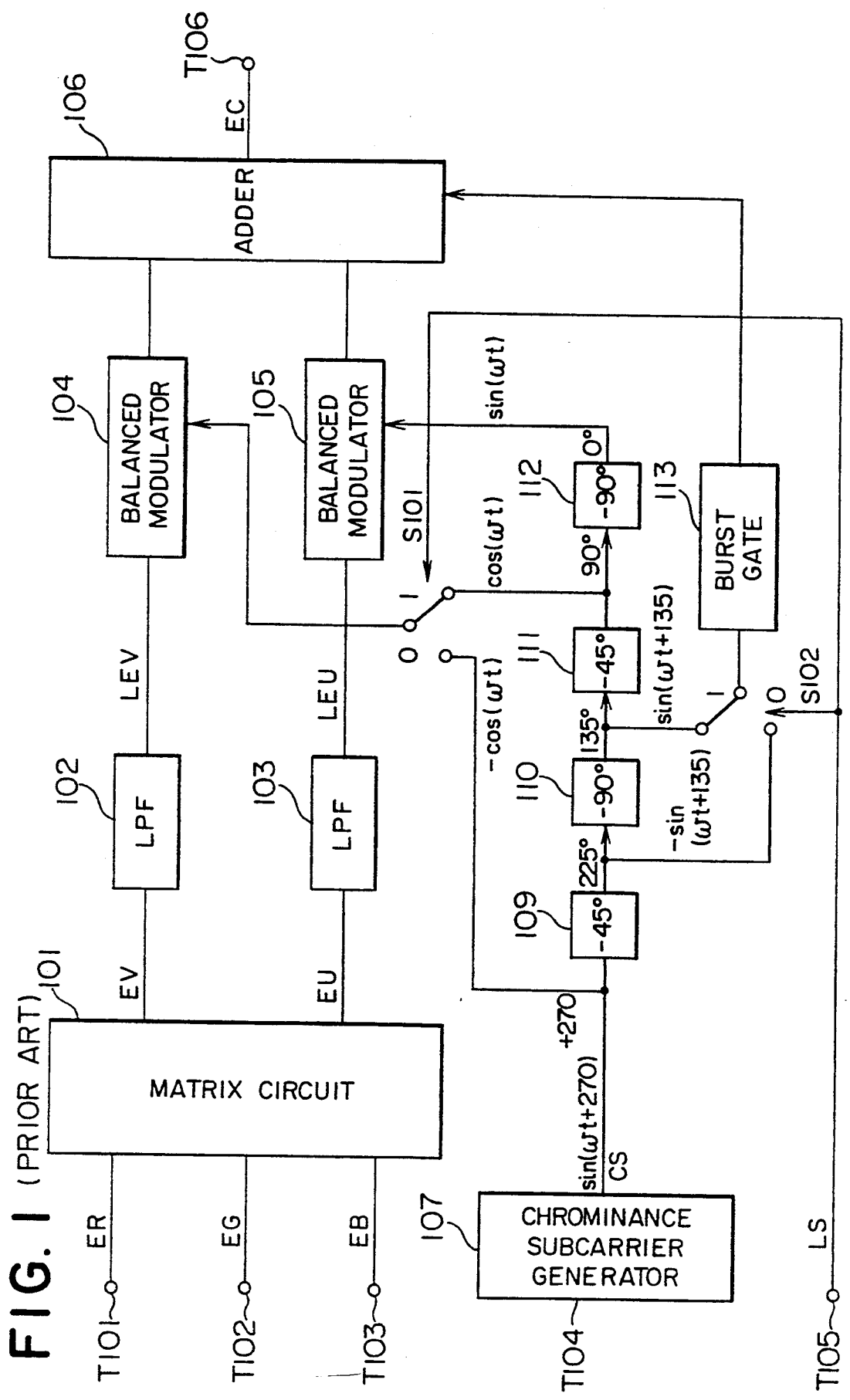
FIG. 1 is a circuit block diagram of a conventional PAL encoder.
Figure 2:
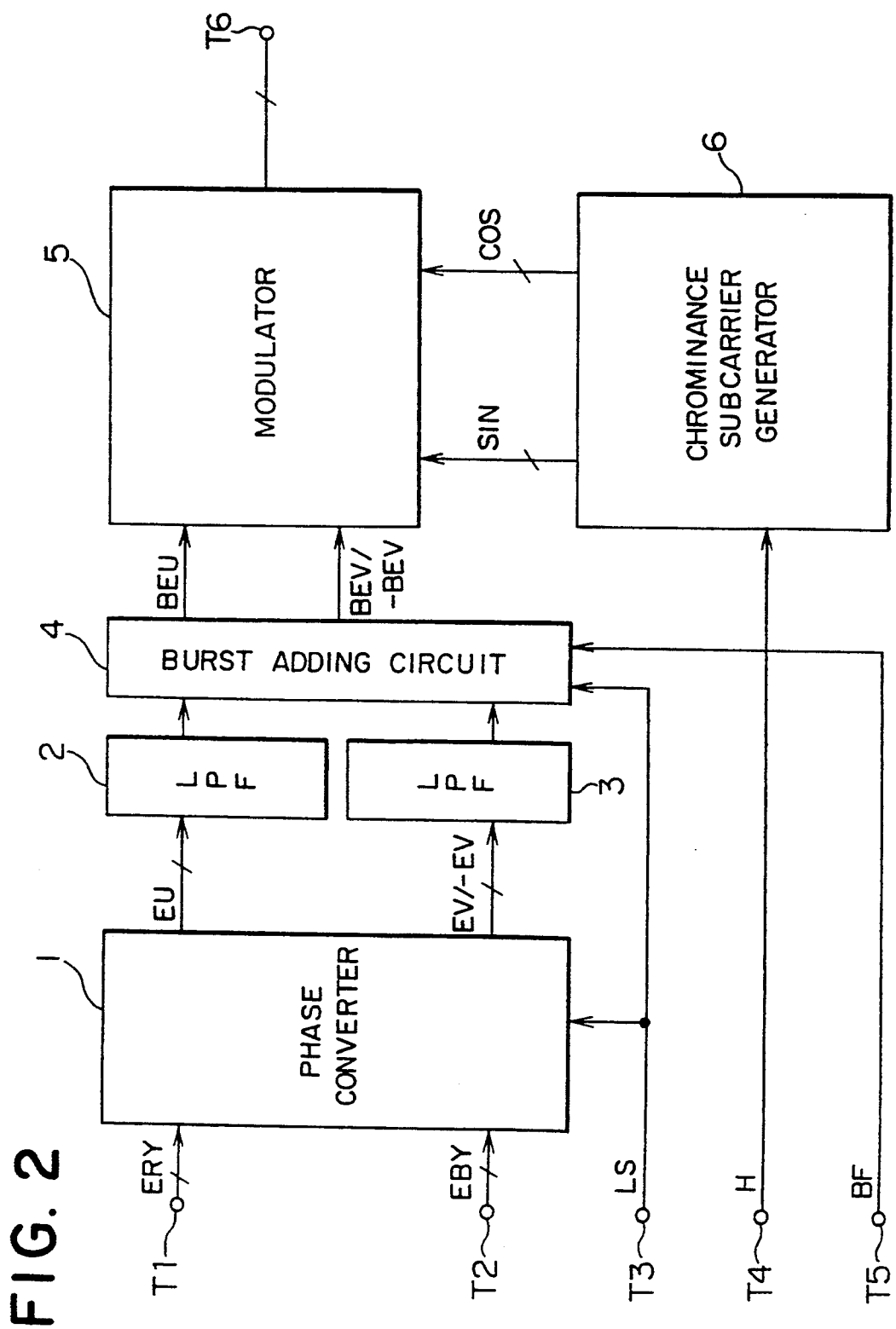
FIG. 2 is a circuit block diagram of a PAL encoder according to an embodiment of the present invention.

FIG. 2 is a block diagram showing an arrangement of the PAL encoder according to the embodiment.

As shown in FIG. 2, the PAL encoder according to the present embodiment comprises a phase converter 1 to which connected are terminals T1 and T2 for receiving digital color-difference signals ERY and EBY, respectively, and which converts the color-difference signals ERY and EBY into U- and V-axes signals EU and EV/-EV, respectively; low-pass filters LPF2 and LPF3 which band-rejects the U- and V-axis signals EU and EV/-EV to output signals LEU and LEV/-LEV, respectively; a burst adding circuit 4 which adds a burst signal to the LEU and LEV/-LEV signals to produce a BEU signal and a BEV/-BEV signal, respectively; a modulator 5; and chrominance subcarrier generator 6.

Figure 3:
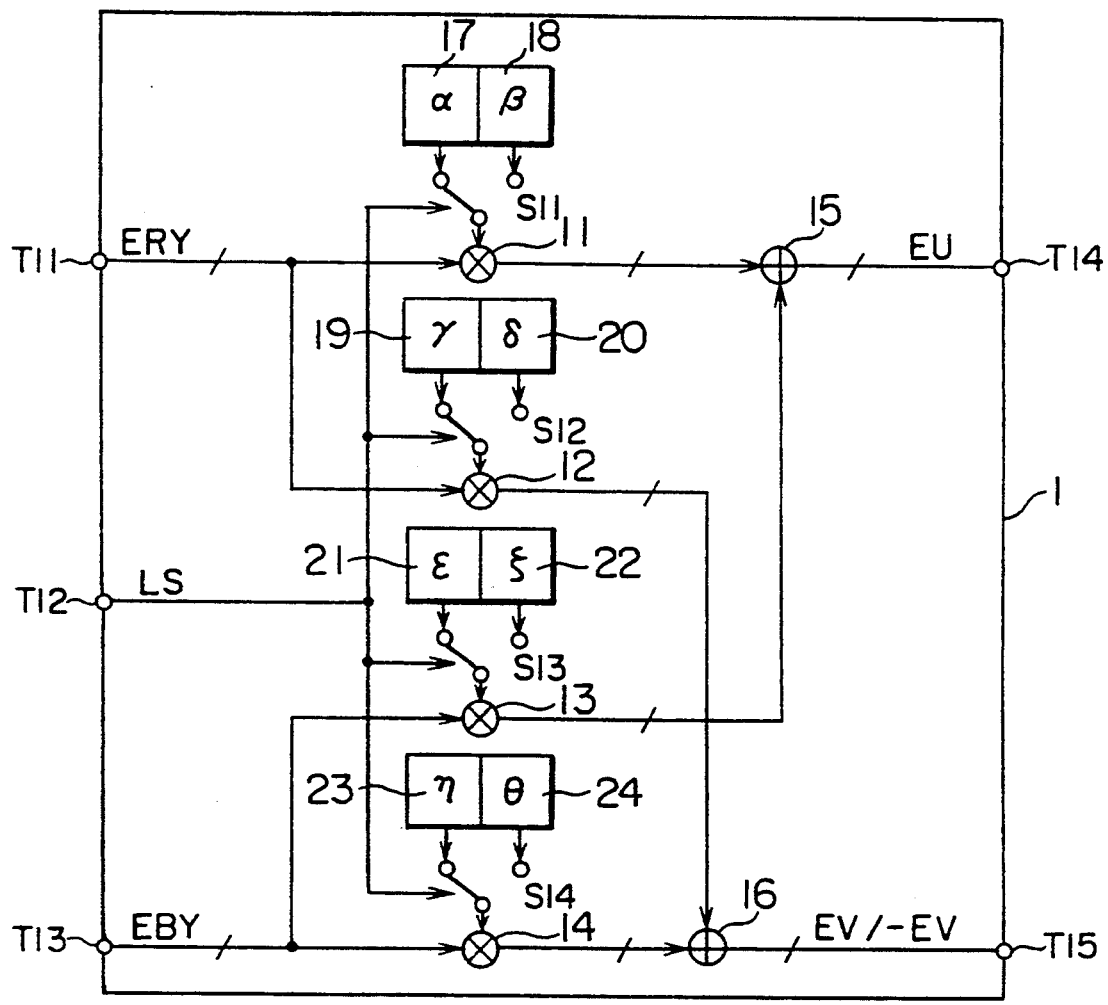
FIG. 3 is a block diagram showing an example of an arrangement of a phase converter shown in FIG. 2.

FIG. 3 is a block diagram showing an example of the arrangement of the phase converter 1. The phase converter 1 comprises multipliers 11 to 14, adders 15 and 16, constant generators 17 to 24 and switch circuits S11 to S14, as shown in FIG. 3.

Figure 4:
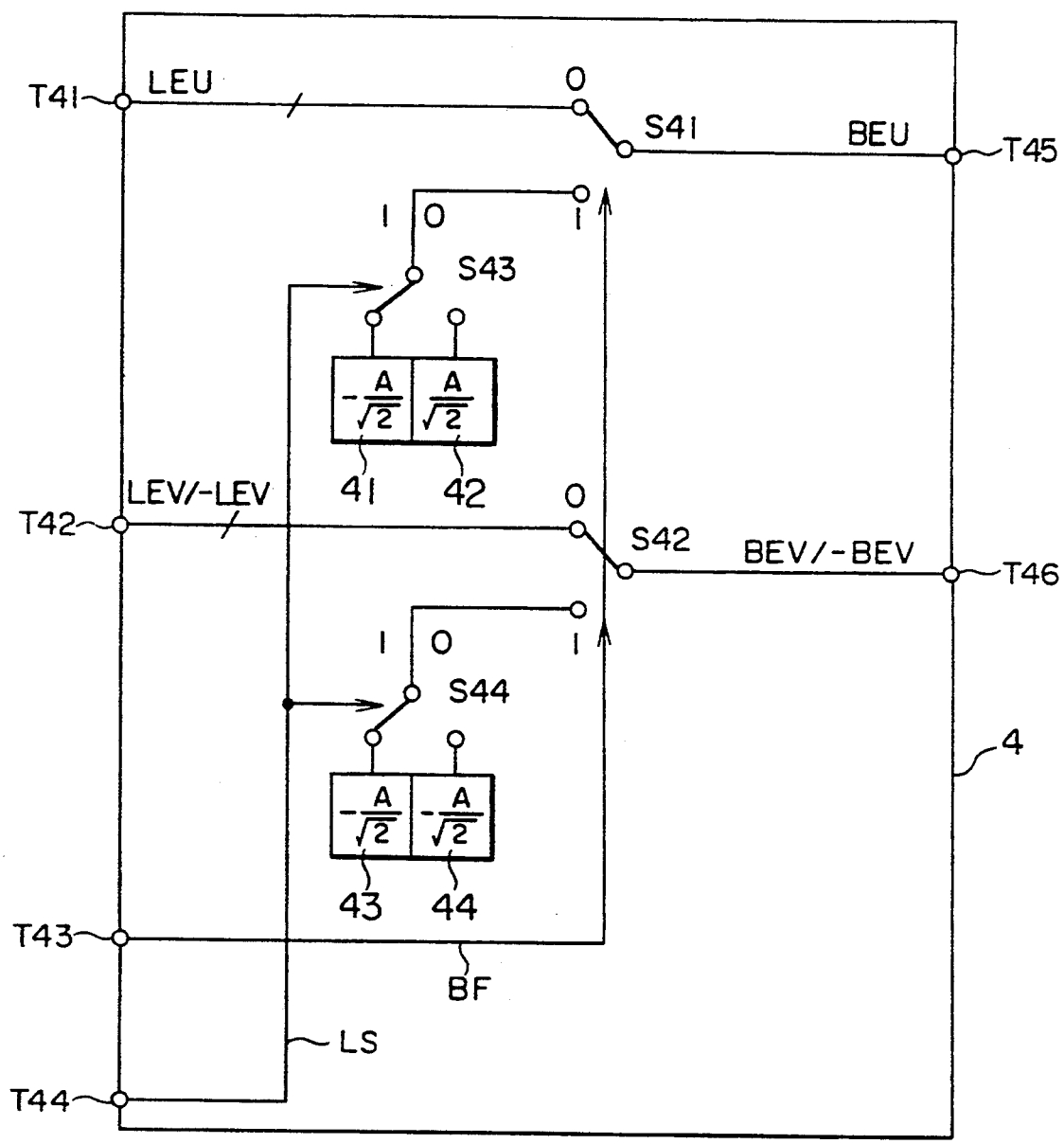
FIG. 4 is a block diagram showing an example of an arrangement of a burst adding circuit shown in FIG. 2.

FIG. 4 is a block diagram showing an example of the arrangement of the burst adding circuit 4. As shown in FIG. 4, the burst adding circuit 4 comprises constant generators 41 to 44 and switch circuits S41 to S44.

Figure 5:
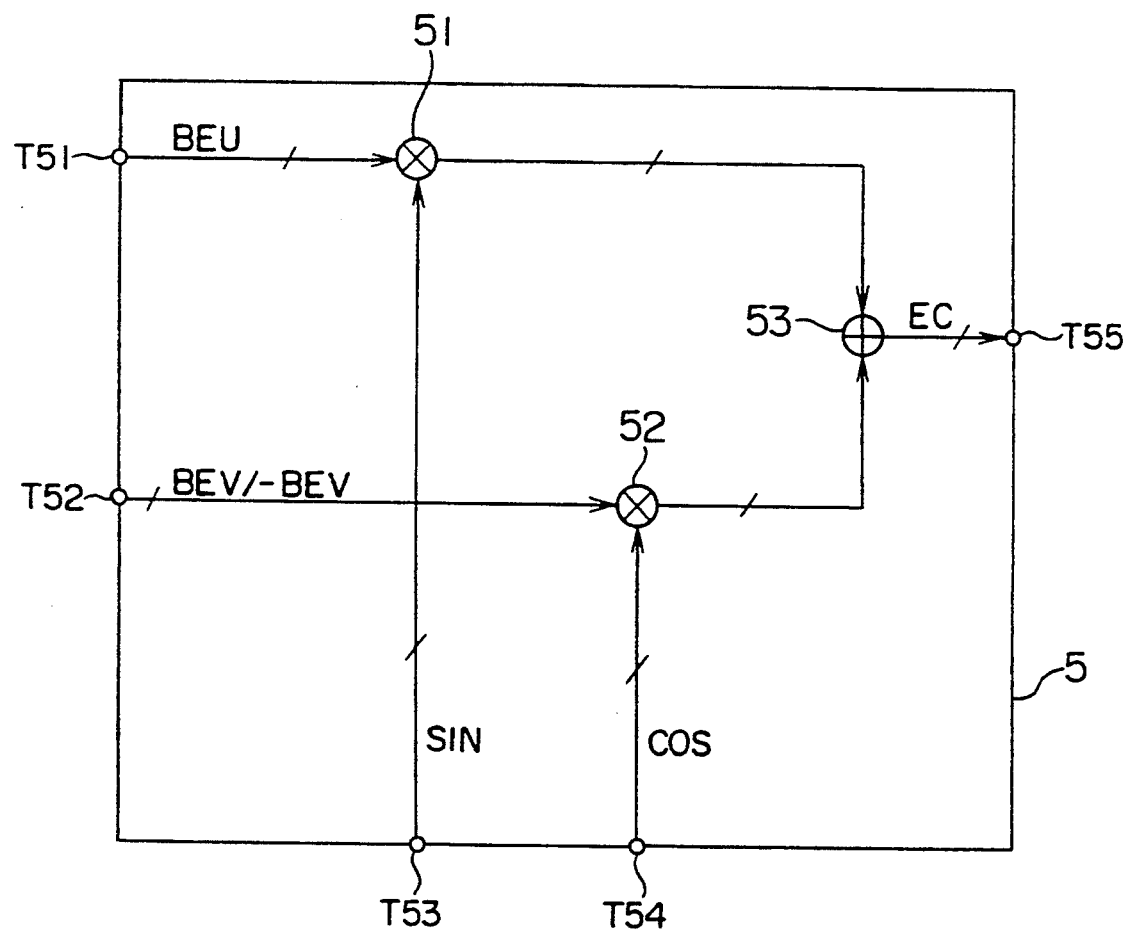
FIG. 5 is a block diagram showing an example of an arrangement of a modulator shown in FIG. 2.

FIG. 5 is a block diagram showing an example of the arrangement of the modulator 5. As shown in FIG. 5, the modulator 5 comprises multipliers 51 and 52 and an adder 53.

Figure 6:
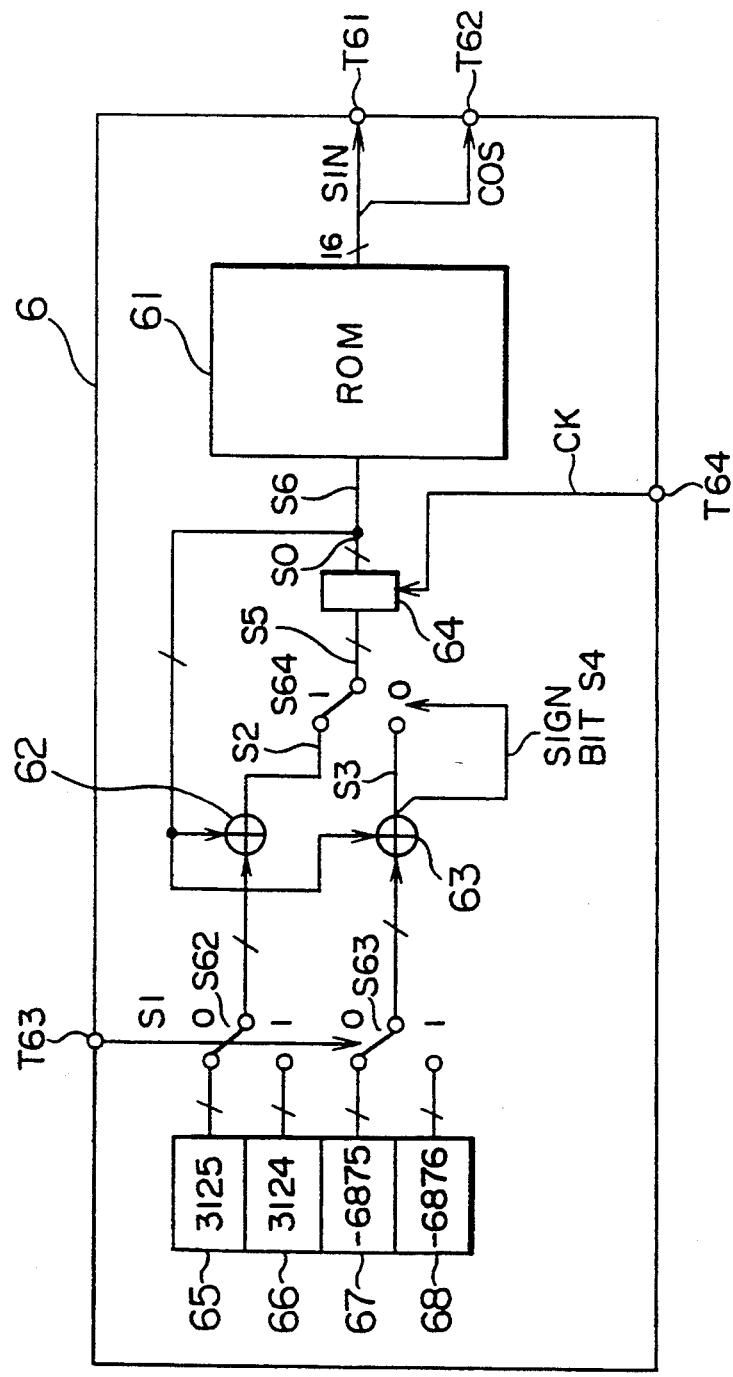
FIG. 6 is a block diagram showing an example of an arrangement of a chrominance subcarrier generator shown in FIG. 2.

FIG. 6 is a block diagram showing an example of the arrangement of the chrominance subcarrier generator 6. As shown in FIG. 6, the chrominance subcarrier generator 6 comprises a read only memory (ROM) 61 having a storage capacity of 16 bits ×625 words; adders 62 and 63; constant generators 65 to 68; a register 64; and switch circuits S61 to S63.

An operation of the PAL encoder according to the embodiment will now be described. An operation of the entire PAL encoder shown in FIG. 2 will now be described with reference to the waveforms shown in FIGS. 7A to 7M.

As shown in FIGS. 7A and 7B, the digital color-difference signals ERY and EBY are sequentially supplied to the input terminals T1 and T2. Further, a line switch signal LS is supplied to the terminal T3 as shown in FIG. 7C. The line switch signal LS becomes H and L levels in the odd and even lines of the first and second fields, respectively, and L and H levels in the odd and even lines of the third and fourth fields, respectively.

The phase converter 1 converts the supplied digital color-difference signals ERY and EBY into phase-corrected digital U- and V-axes signals EU and EV, respectively when the line switch signal LS is at the H level, and into the phase-corrected U- and V-axis signals EU and -EV, respectively when the line switch signal LS is at the L level, as shown in FIGS. 7D and 7E.

LPF2 and LPF3 input signals EU and EV/-EV and output band-limited signals LEU and LEV/-LEV, respectively as shown in FIGS. 7F and 7G.

The burst adding circuit 4 adds to the input signals LEU and LEV/-LEV the signals BU and BV/-BV representing a phase and amplitude of the burst signal to produce the signals BEU and BEV/-BEV shown in FIGS. 7H and 7I, respectively when the burst signal BF shown in FIG. 7J input from the input terminal T5 is at the H level.

The operation frequency fCK of the clock CK shown in FIG. 7K in the present embodiment is represented by the following equation (1).

$$fCK = fH \cdot (1135/n) \cdot 2^{m-2} \qquad (1)$$

wherein fH is a frequency of a horizontal sync signal H (a horizontal sync frequency), and n and m are positive integers. For example, when n=5 and m=4, the fCK will be 908fH.

The chrominance subcarrier generator 6 outputs a cosine signal COS and a sine signal SIN having the frequency of the chrominance subcarrier signal in the PAL system as shown in FIGS. 7K and 7J. The modulator 5 converts the input signals BEU, BEV/-BEV, SIN and COS signals into a signal EC (FIG. 7F) represented by the following equation and outputs the signal EC to the output terminal T6.

$$EC = (BEU \cdot SIN + BEV \cdot COS / BEU \cdot SIN - BEV \cdot COS)$$

This signal EC is the output signal of the PAL encoder in the present embodiment.

A detailed operation of each block will now be described.

An operation of the phase converter 1 shown in FIG. 3 will now be described.

The constant generators 17 to 24 generate constant signals $\alpha$, $\beta$, $\gamma$, $\delta$, $\epsilon$, $\zeta$, $\eta$ and $\Theta$. In this embodiment, $\alpha=0$, $\beta=0$, $\gamma=0.877$, $\delta=-0,877$, $\epsilon=0.493$, $\zeta=-0,493$, $\eta=0$, and $\Theta=0$. The color-difference signals ERY and EBY are input to the input terminals T11 and T13, respectively. The above described line switch signal LS is input to the input terminal T12. The U- and V-axes signals EU, and EV/EV/-EV are output from the output terminals T14 and T15.

The switch S11 selects the constant signal $\alpha$ when the line switch signal LS is at the H level and selects the constant signal $\beta$ when the line switch signal is at the L level and supplies the selected signal to the multiplier 11. The switch S12 selects the constant signals $\gamma$ and $\delta$ when the line switch signal LS is at the H and L levels, respectively, and supplies the selected signal to the multiplier 12. The switch S13 selects the constant signals $\epsilon$ and $\zeta$ when the line switch signal is at the H and L levels, respectively and supplies the selected signal to the multiplier 13. The switch 14 selects the constant signals $\eta$ and $\Theta$ when the line switch signal LS is at the H and L levels, respectively and supplies the selected signal to the multiplier 14.

The multiplier 11 multiplies the signal selected by the switch S11 by the color-difference signal ERY and supplies the result to the adder 15. The multiplier 12 multiplies the signal selected by the switch S12 by the color-difference signal ERY and supplies the result to the adder 16. The multiplier 13 multiplies the signal selected by the switch S13 by the color-difference signal EBY and supplies the result to the adder 15. The multiplier 14 multiplies the signal selected by the switch S14 by the color-difference signal EBY and supplies the result to the adder 16.

The adder 15 adds the outputs of the multipliers 11 and 13 to produce the U-axis signal EU. The adder 16 adds the outputs of the multipliers 12 and 14 to produce the V-axis signal EV/-EV.

The above described operation will be summarized as follows.

When the line switch signal LS is at the H level, $$EU = \alpha ERY + \epsilon EBY = 0,493 EBY$$

$$EV = \gamma ERY + \eta EBY = 0,877 ERY$$

When the line switch signal LS is at the L level, $$EU = \beta ERY + \zeta EBY = 0,493 EBY$$

$$-EV = \delta ERY + \theta EBY = -0.877 ERY$$

An operation of the burst adding circuit shown in FIG. 4 will now be described.

The constant generators 41 to 44 generate constant signals representing constants $-A/(2^{\frac{1}{2}})$, $A/(2^{\frac{1}{2}})$, $-A/(2^{\frac{1}{2}})$, and $-A/(2^{\frac{1}{2}})$, respectively. In this embodiment, "A" represents an burst amplitude in the PAL system.

The switch S43 is controlled by the line switch signal LS to select the constant $-A/(2^{\frac{1}{2}})$ in the odd lines of the first and second fields and in the even lines of the third and fourth fields, and select the constant $-A/(2^{\frac{1}{2}})$ in the even lines of the first and second fields and in the odd lines of the third and fourth fields.

The switch S44 is controlled by the line switch signal LS to select the constant $A/(2^{\frac{1}{2}})$ from the constant generator 43 in the odd lines of the first and second fields and in the even lines of the third and fourth fields, and select the constant $-A/(2^{\frac{1}{2}})$ from the constant generator 44 in the even fields of the first and second fields and in the odd lines of the third and fourth fields.

The input terminal T41 receives the U-axis signal LEU from the LPF 2. The input terminal T42 receives the V-axis signal LEV/-LEV from the LPF 3. The input terminal T43 receives the burst control signal BF indicating the burst signal insertion position.

The switch circuit S41 selects the output from the switch circuit S43 when the burst control signal BF is at the H level, selects the U-axis signal LEU from the input terminal T41 when the burst control signal BF is at the L level, and outputs the selected signal from the output terminal T45 as the burst-added signal BEU. The switch circuit S42 selects the output from the switch circuit S44 when the burst control signal BF is at the H level, selects the V-axis signal LEV/-LEN from the input terminal T42 when the burst control signal BF is at the L level, and outputs the selected signal from the output terminal T46 as the burst-added signal BEV/-BEV.

An operation of the modulator 5 will now be described with reference to FIG. 5.

The U-axis burst-added signal BEU from the burst adding circuit 4 is supplied to the multiplier 51 through the input terminal T51. The sine signal SIN from the chrominance subcarrier generator 6 is input to the multiplier 51 through the input terminal T53. The V-axis burst-added signal BEV/-BEV from the burst adding circuit 4 is input to the multiplier 52 through the input terminal T52. The cosine signal COS from the chrominance subcarrier generator 6 is input to the multiplier 52 through the input terminal T54.

The multiplier 51 multiplies the U-axis burst-added signal BEU by the sine signal SIN, and supplies the multiplied result to the adder 53. The multiplier 52 multiplies the V-axis burst-added signal BEV/-BEV by the cosine signal COS and supplies the multiplied result to the adder 53.

The adder 53 adds the outputs of the multipliers 51 and 52 and outputs the added result to the terminal T55 as the chroma signal.

The operation of the modulator shown in FIG. 5 can be summarized by the following equation.

$$EC = BEU \times SIN + (BEV/-BEV) - COS$$

An operation of the chrominance subcarrier generator 6 shown in FIG. 6 will now be described.

The following values with figures below the decimal places been omitted are stored in the ROM 61 in the upper and lower 8 bits in the ith address location, respectively.

$$256.0 \times \sin(2.0 \times i/256.0) - 0.5 (i=0, 1, \ldots, 624)$$

$$256.0 \times \cos(2.0 \times i/256.0) - 0.5 (i=0, 1, \ldots, 624)$$

The register 64 holds the input signal in response to the trailing edge of the clock CK shown in FIG. 8A and supplied from terminal T64, and outputs the held value in response to the leading edge of the clock CK.

The constant generators 65 to 68 generate 625n, 625n-1, 625(n-$2^m$), 625(n-$2^m$)−1. The numbers n and m satisfy the equation (1). As described, according to the present invention, n and m are "5" and "4", respectively. As a result, these values are 3125, 3124, −6875, and −6876.

An operation of the chrominance subcarrier generator 6 shown in FIG. 6 will now be described with reference to the waveforms shown in FIGS. 8A to 8J.

Assume now that an initial value of the output S0 of the register 64 shown in FIG. 8C is "0." In the initial state, the signal S1 (FIG. 8B) input from the input terminal T63 is at the L level. The signal S1 is generated based on the horizontal sync signal H and becomes H level only during only the last clock period in each horizontal scanning interval. The switches S62 and S63 select and supply to the adders 62 and 63 the constants 3125 and −6875 output from the constant generators 65 and 67, respectively.

The adder 62 adds the output S0 (=0) of the register 64 and constant "3125" from the constant generator 65 to produce signal S2=3125 as shown in FIG. 8D. The adder 63 adds the output S0 (=0) of the register 64 and the constant "−6875" from the constant generator 67 to produce the result S3=−6875 as shown in FIG. 8E. The sign bit S4 of the output of the adder 63 becomes the H level as shown in FIG. 8F. Accordingly, as shown in FIG. 8G, the switch circuit S64 selects and supplies the signal S2 to the register 64 as the signal S5. The register 64 receives the signal S5 (=3125) in synchronism with the trailing edge of the clock CK and outputs the same in synchronism with the leading edge of the clock CK shown in FIG. 8A.

The address input terminal of the ROM 61 receives the address signals S6 of upper 10 bits of the signal S5. Since the signal S5=0, then the signal S6=0.

The upper 8 bits in the address 0 of the ROM 61 hold data "0" (an integral part of 256.0×sin(2.0×0/256.0)-0.5). Similarly, the lower 8 bits hold data "255" (an integral part of 256.0×cos(2.0×0/256.0)-0.5). For this reason, as shown in FIG. 8I and 8J, the ROM 61 outputs "0" and "255" as signals S7 (SIN) and S8 from the output terminals T61 and T62, respectively.

In the next cycle of the clock CK shown in FIG. 8A, the output S0 of the register 64 will be "3125." As shown in FIG. 8B, since the signal S1 is at the L level, the values of the added outputs S2 and S3 are "6250" and "−3750", as shown in FIGS. 8C and 8D, respectively. The sign bit S4 of the output signal of the adder 63 becomes the H level as shown in FIG. 8F. As a result, the switch circuit S61 outputs the added output S2 (=6250) to the register 64 as S5 as shown in FIG. 8G. As shown in FIG. 8H, the signal S6 becomes "195 (an integer part of 3125/16)". As shown in FIGS. 8I and 8J, the ROM 61 outputs, in response to the address signal S6, "236" and "−97" as signals S7 (SIN) and S8 from the output terminals T61 and T62, respectively.

Similar operations are repeated and thus the added outputs S2 and S3 will be "12500" and "2500", respectively when the output S0 of the register 64 is the "9375" and the signal S1 is at the L level. At this time, the sign bit S4 of the adder 63 is at the L level, and thus the switch circuit S61 supplies the added output S3 (=2500) to the register 64 as S5. The signal S6 becomes "585 (an integer part of 9375/16). The ROM 61 outputs, in response to the address signal S6, the "−100" and "235" from the output terminals T61 and T62 as the signals S7 (SIN) and S8, respectively.

When the output S0 of the register 64 is "1875" and the signal S1 is at the H level, the signals "3124" and "−6876" output from the constant generators 66 and 68 are supplied to the adders 62 and 63, respectively and added outputs S2=4999 and S3=−5001 are obtained. The sign S4 of the adder 63 becomes the H level, and thus the switch circuit S61 supplies the added output S2 as S5. The address signal S6 becomes "390 (an integer part 6250/16). The ROM 61 outputs "177" and "184" from the output terminals T61 and T62 as the signals S7 (SIN) and S8, respectively.

The present invention is not limited to the above embodiment and various modifications are available. For example, in the above embodiment, the operational clock frequency fCK is 908 times the horizontal sync frequency fH. However, the operational clock frequency fCK may be any value so long as it satisfies the equation (1). For example, if n and m are set to values "1" and "2", respectively, the operational clock frequency fCK will be 1135 times the horizontal sync frequency fH.

As has been described above, according to the PAL encoder of the present invention, the chrominance subcarrier signal is generated by the digital circuit and encoded by the digital signal processing. Accordingly, the phase distortion can be suppressed and a stable chroma signal can be generated.

What is claimed is:

1. A PAL encoder, comprising:
   phase converting means for receiving and converting first and second digital color-difference signals into a digital U-axis signal and a digital V-axis signal of U-axis and V-axis components in a UCS system of color representation;
   burst signal adding means coupled to the phase converting means for adding a predetermined burst signal to the digital U-axis and V-axis signals to produce burst-added U-axis and V-axis signals, respectively;
   chrominance subcarrier generator for outputting digital sine and cosine signals having a predetermined frequency of a chrominance subcarrier signal; and
   modulating means coupled to the burst signal adding means and the chrominance subcarrier generator for multiplying the burst-added U-axis signal by the sine signal and the burst-added V-axis signal by the cosine signal, and for adding the multiplied results to produce a digital chroma signal;
   wherein the phase converting means comprises:
   a first constant generator for generating predetermined first to eighth constants;
   a first switch circuit, coupled to the first constant generator, for selecting one of the first and second constants in response to a line switch signal in synchronism with a horizontal scanning line;
   a second switch circuit, coupled to the first constant generator, for selecting one of the third and fourth constants in response to the line switch signal;
   a third switch circuit, coupled to the first constant generator, for selecting one of the fifth and sixth constants in response to the line switch signal;
   a fourth switch circuit, coupled to the first constant generator, for selecting one of the seventh and eighth constants in response to the line switch signal;
   a first multiplier for multiplying the first color-difference signal by the output of the first switch circuit;
   a second multiplier for multiplying the first color-difference signal by the output of the second switch circuit;
   a third multiplier for multiplying the second color-difference signal by the output of the third switch circuit;
   a fourth multiplier for multiplying the second color-difference signal by the output of the fourth switch circuit;
   a first adder for adding the outputs of the first and third multipliers and outputs the added result as the digital U-axis signal; and
   a second adder for adding the outputs of the second and fourth multipliers and outputs the added result as the digital V-axis signal.

2. The PAL encoder according to claim 1, wherein the first to eighth constants are "0", "0", "0.877", "−0.877", "0.493", "0,493", "0", and "0", respectively;
   the first switch circuit selects, in response to the line switch signal, the first constant in the odd lines of first and second fields and in the even lines of third and fourth fields, and the second constant in the even lines of the first and second fields and in the odd lines of the third and fourth fields;
   the second switch circuit selects, in response to the line switch signal, the third constant in the odd lines of the first and second fields and in the even lines of the third and fourth fields, and the fourth constant in the even lines of the first and second fields and in the odd lines of the third and fourth fields;

the third switch circuit selects, in response to the line switch signal, the fifth constant in the odd lines of the first and second fields and in the even lines of the third and fourth fields, and sixth constant in the even lines of the first and second fields and in the odd lines of the third and fourth fields; and the fourth switch circuit selects, in response to the line switch signal, the seventh constant in the odd lines of the first and second fields and in the even fields of the third and fourth fields, and the eighth constant in the even lines of the first and second fields and in the odd lines of the third and fourth fields.

3. A PAL encoder, comprising:

phase converting means for receiving and converting first and second digital color-difference signals into a digital U-axis signal and a digital V-axis signal of U-axis and V-axis components in a UCS system of color representation;

burst signal adding means coupled to the phase converting means for adding a predetermined burst signal to the digital U-axis and V-axis signals to produce burst-added U-axis and V-axis signals, respectively;

chrominance subcarrier generator for outputting digital sine and cosine signals having a predetermined frequency of a chrominance subcarrier signal; and modulating means coupled to the burst signal adding means and the chrominance subcarrier generating means, for multiplying the burst-added U-axis signal by the sine signal and the burst-added V-axis signal by the cosine signal, and for adding the multiplied results to produce a digital chroma signal;

wherein the burst signal adding means comprises:

a second constant generator for generating ninth to twelfth constants;

a fifth switch circuit coupled to the second constant generator for selecting one of the ninth and tenth constants in response to the line switch signal;

a sixth switch circuit coupled to the second constant generator, for selecting one of the eleventh and twelfth constants in response to the line switch signal;

a seventh switch circuit for selecting one of the U-axis signal and the output of the fifth switch circuit to produce the burst-added U-axis signal in response to a predetermined burst control signal; and an eighth switch circuit for selecting one of the V-axis signal and the output of the sixth switch circuit to produce the burst-added V-axis signal in response to the burst control signal.

4. The PAL encoder according to claim 3, wherein the ninth to twelfth constants are "$-A/(2^{\frac{1}{2}})$", "$-A/(2^{\frac{1}{2}})$", "$A/(2^{\frac{1}{2}})$", and "$-A/(2^{\frac{1}{2}})$", respectively;

the fifth switch circuit selects, in response to the line switch signal, the ninth constant in the odd lines of first and second fields and in the even lines of third and fourth fields, and tenth constant in the even lines of the first and second fields and in the odd lines of the third and fourth fields;

the sixth switch circuit selects, in response to the line switch signal, the eleventh constants in the odd lines of the first and second fields and in the even lines of the third and fourth fields, and the twelfth constant in the even lines of the first and second fields and in the odd lines of the third and fourth fields;

the seventh switch circuit selects the output of the fifth switch circuit when the burst control signal indicates a burst signal insertion position; and the eighth switch circuit selects the output of the sixth switch circuit when the burst control signal indicates the burst signal insertion position.

5. A PAL encoder, comprising:

phase converting means for receiving and converting first and second digital color-difference signals into a digital U-axis signal and a digital V-axis signal of U-axis and V-axis components in a UCS system of color representation;

burst signal adding means coupled to the phase converting means for adding a predetermined burst signal to the digital U-axis and V-axis signals to produce burst-added U-axis and V-axis signals, respectively;

chrominance subcarrier generator for outputting digital sine and cosine signals having a predetermined frequency of a chrominance subcarrier signal; and modulating means coupled to the burst signal adding means and the chrominance subcarrier generator for multiplying the burst-added U-axis signal by the sine signal and the burst-added V-axis signal by the cosine signal, and for adding the multiplied results to produce a digital chroma signal;

wherein the chrominance subcarrier generator comprises:

a memory for storing, in each address location, values of the sine and cosine signals corresponding to addresses;

a third constant generator for generating predetermined thirteenth to sixteenth constants;

a ninth switch circuit for selecting one of the thirteenth and fourteenth constants in response to the switch control signal;

a tenth switch circuit for selecting one of the fifteenth and sixteenth constants in response to the switch control signal;

a third adder for receiving one input of which receives the output of the ninth switch circuit;

a fourth adder one input of which receives the output of the tenth switch circuit;

an eleventh switch circuit, controlled by the output of the second adder, for selecting one of the outputs of the third and fourth adders; and a temporary storage for receiving a clock signal and receiving the output of the eleventh switch circuit in response to the clock signal, and outputting the received output as the address for the memory as well as supplying to the other input terminals of the third and fourth adders.

6. The PAL encoder according to claim 5 wherein the memory is comprised of a read only memory.

7. The PAL encoder according to claim 5 wherein the memory is comprised of a read only memory.

8. The PAL encoder according to claim 5 wherein a frequency of the clock signal is an integral part of $(1135/n) \times 2^{m-2}$ (m and n are positive integers) times a horizontal sync signal frequency.

9. The PAL encoder according to claim 8, wherein the thirteenth to sixteenth constants generated by the chrominance subcarrier generating means are "625n", "625n-1", "$625(n-2^m)$", and "$625(n-2^m)-1$", respectively.

* * * * *

UNITED STATES PATENT AND TRADEMARK OFFICE
CERTIFICATE OF CORRECTION

PATENT NO. : 5,406,335
DATED : April 11, 1995
INVENTOR(S) : Hidemitsu NIKOH

It is certified that error appears in the above-indentified patent and that said Letters Patent is hereby corrected as shown below:

Col. 4, line 49, delete "$\delta=-0,877$" insert --$\delta=-0.877$--

Col. 4, line 50 delete "0,493" insert --0.493--

Col. 4, line 54 delete "EV/EV/" and insert --EV/--

Col. 5, line 22 delete "0,493" insert --0.493--

Col. 5, line 24 delete "0,877" insert --0.877--

Col. 5, line 28 delete "0,493" insert --0.493--

Col. 6, line 27 delete "XCOS" to read --x COS--.

Col. 8, line 60 delete "0,493" insert --0.493--

Signed and Sealed this

Fifth Day of September, 1995

Attest:

BRUCE LEHMAN

Attesting Officer

Commissioner of Patents and Trademarks